US009648033B2

United States Patent
Crume (10) Patent No.: US 9,648,033 B2
(45) Date of Patent: *May 9, 2017

(54) SYSTEM FOR DETECTING THE PRESENCE OF ROGUE DOMAIN NAME SERVICE PROVIDERS THROUGH PASSIVE MONITORING

(71) Applicant: International Business Machines Corporation, Armonk, NY (US)

(72) Inventor: Jeffery L. Crume, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/884,899

(22) Filed: Oct. 16, 2015

(65) Prior Publication Data

US 2016/0036845 A1 Feb. 4, 2016

Related U.S. Application Data

(63) Continuation of application No. 13/479,412, filed on May 24, 2012, now Pat. No. 9,225,731.

(51) Int. Cl.
*H04L 29/06* (2006.01)
*H04L 29/12* (2006.01)
*H04L 12/26* (2006.01)

(52) U.S. Cl.
CPC .......... *H04L 63/1425* (2013.01); *H04L 61/10* (2013.01); *H04L 61/1511* (2013.01);
(Continued)

(58) Field of Classification Search
None
See application file for complete search history.

(56) References Cited

U.S. PATENT DOCUMENTS 7,706,267 B2 * 4/2010 Ford et al. .................... 370/230
7,756,933 B2    7/2010 Reshef et al.
(Continued)

FOREIGN PATENT DOCUMENTS

| CN | 101567815 A | 10/2009 |
| CN | 102082836 A | 6/2011 |
| CN | 102223422 A | 10/2011 |

OTHER PUBLICATIONS

Chinese Patent Office, Office Action for CN 201310195777.3 dated Nov. 6, 2016, 9 pages.
(Continued)

*Primary Examiner* — Uzma Alam
(74) *Attorney, Agent, or Firm* — Daniel Simek; Hoffman Warnick LLC (57) ABSTRACT

A method, system, computer program product embodied in a computer readable storage medium, and computer system are disclosed for identifying a rogue domain name service (DNS) server. Embodiments include passively monitoring traffic on a target network; and identifying a DNS resolution response in the traffic on the network. The DNS resolution response includes a mapping of a domain to an internet protocol (IP) address. The DNS resolution response is compared with a preconfigured list of known mappings of domains to IP addresses. Based on the results of the comparison, it can be determined whether the DNS resolution response is correct. In cases where the DNS resolution response is incorrect, the provider of the DNS resolution response is a rogue DNS server.

5 Claims, 5 Drawing Sheets

(52) U.S. Cl.
CPC ...... *H04L 63/1408* (2013.01); *H04L 63/1466* (2013.01); *H04L 63/1483* (2013.01); *H04L 43/00* (2013.01)

(56) References Cited

U.S. PATENT DOCUMENTS

| | | | |
|---|---|---|---|
| 7,823,202 | B1 | 10/2010 | Nucci et al. |
| 7,873,993 | B2 | 1/2011 | King |
| 8,055,768 | B2 | 11/2011 | Saunderson et al. |
| 8,069,483 | B1 | 11/2011 | Matlock |
| 8,312,541 | B2 | 11/2012 | Levy-Abegnoli et al. |
| 8,370,933 | B1* | 2/2013 | Buckler ............................ 726/22 |
| 2004/0030796 | A1 | 2/2004 | Cooper et al. |
| 2004/0111640 | A1 | 6/2004 | Baum |
| 2006/0176822 | A1* | 8/2006 | Doyle et al. ................... 370/241 |
| 2006/0253612 | A1 | 11/2006 | Cheshire |
| 2007/0186276 | A1 | 8/2007 | McRae et al. |
| 2007/0271220 | A1* | 11/2007 | Carter .............................. 707/2 |
| 2008/0060054 | A1 | 3/2008 | Srivastava |
| 2008/0147837 | A1* | 6/2008 | Klein et al. .................... 709/223 |
| 2008/0307516 | A1 | 12/2008 | Levy-Abegnoli et al. |
| 2009/0327487 | A1 | 12/2009 | Olson et al. |
| 2010/0031362 | A1 | 2/2010 | Himberger et al. |
| 2010/0142709 | A1 | 6/2010 | Robert et al. |
| 2010/0262688 | A1 | 10/2010 | Hussain et al. |
| 2010/0291943 | A1 | 11/2010 | Mihaly et al. |
| 2011/0106919 | A1 | 5/2011 | Mazur et al. |
| 2011/0191455 | A1* | 8/2011 | Gardner ......................... 709/223 |
| 2011/0208838 | A1* | 8/2011 | Thomas et al. ............... 709/219 |
| 2011/0214180 | A1 | 9/2011 | Gunawardena |
| 2011/0231931 | A1 | 9/2011 | Ma |
| 2011/0271345 | A1 | 11/2011 | Wolman et al. |
| 2012/0124087 | A1* | 5/2012 | Malan et al. .................. 707/770 |
| 2013/0318170 | A1 | 11/2013 | Crume |
| 2013/0318605 | A1 | 11/2013 | Crume |
| 2013/0332986 | A1* | 12/2013 | Sima et al. ....................... 726/1 |
| 2013/0333038 | A1* | 12/2013 | Chien ............................. 726/23 |

OTHER PUBLICATIONS

Han et al.; "A Timing-Based Scheme for Rogue AP Detection", Parallel and Distributed Systems, IEEE Transactions on, vol. 22, Issue 11, Nov. 2011, pp. 1912-1925.

Dagon et al.; "Corrupted DNS Resolution Paths: The Rise of a Malicious Resolution Authority", ISC/OARC Workshop 2007, pp. 1-33.

Han et al.; "A Measurement Based Rogue AP Detection Scheme", INFOCOM IEEE, Apr. 19-25, 2009, pp. 1593-1601.

Caglayan et al.; "Real-Time Detection of Fast Flux Service Networks", CATCH'09 Cybersecurity Applications & Technology, IEEE, Mar. 3-4, 2009, pp. 285-292.

Mano et al.; "RIPPS: Rogue Identifying Packet Payload Slicer Detecting Unauthorized Wireless Hosts Through Network Traffic Conditioning", ACM Journal Name, vol. V. No. N. May 2007, pp. 1-2.

Hassan et al.; "Rogue DHCP Server Detection", retrieved from IP.com Prior Art Database, IP No. IPCOM000189334D, Nov. 5, 2009, 10 pages.

Qu et al.; "RaPiD: An Indirect Rogue Access Points Detection System", IPCCC IEEE 29th International Conference on, Dec. 9-11, 2010, pp. 9-16.

Beyah et al.; "Rogue-Access-Point Detection: Challenges, Solutions, and Future Directions", Security & Privacy, IEEE, Sep.-Oct. 2011, vol. 9, Iss. 5, pp. 56-61.

Alam, Office Action Communication for U.S. Appl. No. 13/479,412 dated Jul. 2, 2014, 34 pages.

Alam, Office Action Communication for U.S. Appl. No. 13/479,412 dated Jan. 27, 2015, 19 pages.

Alam, Notice of Allowance and Fee(s) Due for U.S. Appl. No. 13/479,412 dated Jul. 17, 2015, 6 pages.

Application No. DE 10 2013 208 923.6, Office Action dated Jan. 27, 2014, 12 pages.

Torres-Diaz, Office Action Communication for U.S. Appl. No. 13/479,418, dated Jul. 2, 2014, 13 pages.

Torres-Diaz, Office Action Communication for U.S. Appl. No. 13/479,418 dated Nov. 5, 2014, 14 pages.

Torres-Diaz, Office Action Communication for U.S. Appl. No. 13/479,418 dated Nov. 26, 2013, 11 pages.

Torres-Diaz, Office Action Communication for U.S. Appl. No. 13/479,418 dated May 9, 2013, 17 pages.

* cited by examiner

| Known DNS Resolutions | |
|---|---|
| company.com | xxx.*.*.* |
| mybank.com | yyy.yyy.yyy.yyy |
| email.org | zzz.zzz.zzz.1?? |

FIG. 5

SYSTEM FOR DETECTING THE PRESENCE OF ROGUE DOMAIN NAME SERVICE PROVIDERS THROUGH PASSIVE MONITORING

TECHNICAL FIELD

The invention relates generally to identifying untrusted or compromised sources for network information. More particularly, the invention relates to identifying rogue DNS servers via passive monitoring.

BACKGROUND

The Domain Name Service (DNS) resolves alphanumeric domain names into numeric IP addresses. This service is provided by a loose collection of servers scattered around the Internet as well as within local Intranets. If, however, the information supplied through this service comes not from an authorized source, but rather, an attacker's system supplying incorrect information or from an authorized source that has been compromised, network traffic could be impeded in a denial of service (DOS) attack or misrouted in a spoofing or man-in-the-middle attack. This could result in sensitive traffic being delivered to untrusted systems or not being delivered at all.

One way that these services could be subverted would be if an attacker set up an "evil twin" WiFi hotspot which impersonates a trusted wireless access point and establishes itself as a man-in-the-middle (MITM), which reroutes network traffic. The MITM can examine and modify all traffic coming into and going out of the rogue network. Another way would be for the attacker to set up a rogue server which hijacks network services by broadcasting to all nodes in the network that it is online and available to process DNS requests. Yet another way would be for an attacker to compromise a trusted DNS server and cause it to produce erroneous results. In many cases, the last server to broadcast will be considered authoritative by other nodes in the network.

One solution for detecting such untrusted or compromised sources of network information is the use of a DNS watcher which performs a "health check" by polling a preconfigured list of trusted DNS servers to verify that they are operational and are returning proper results. There are several drawbacks to this method, however. Polling operations generate additional, superfluous network traffic, and may be discovered by an attacker's reconnaissance of the target network. A polling approach also only verifies whether known DNS servers are performing properly. By virtue of the active nature of polling specific known DNS servers, it is unable to verify the correctness of DNS resolutions returned by hosts other than the known hosts being polled. Since rogue DNS providers would not be known in advance, they would go unchecked by a polling solution.

BRIEF DESCRIPTION

In general, aspects of the present invention provide a passive monitoring solution for identifying a rogue DNS server in a network which does not generate additional network traffic, and is able to monitor DNS resolutions provided by both known and unknown DNS servers.

A first aspect of the disclosure provides a method for identifying a rogue domain name service (DNS) server. The method comprises: passively monitoring traffic on a network; identifying a DNS resolution response in the traffic on the network, wherein the DNS resolution response includes a mapping of a domain to an internet protocol (IP) address; comparing the DNS resolution response with a preconfigured list of known mappings of domains to IP addresses; and determining whether the DNS resolution response is correct based on the comparing.

A second aspect of the disclosure provides a system for identifying a rogue domain name service (DNS) server. The system comprises: a monitoring component for passively monitoring traffic on a network; an identification component for identifying a DNS resolution response in the traffic on the network, wherein the DNS resolution response includes a mapping of a domain to an internet protocol (IP) address; a comparison component for comparing the DNS resolution response with a preconfigured list of known mappings of domains to IP addresses; and a determination component for determining whether the DNS resolution response is correct based on the comparing.

A third aspect of the disclosure provides a computer program product embodied in a computer readable storage medium which, when executed by a computing device, causes the computer system to implement a method for identifying a rogue domain name service (DNS) server. The method comprises: passively monitoring traffic on a network; identifying a DNS resolution response in the traffic on the network, wherein the DNS resolution response includes a mapping of a domain to an internet protocol (IP) address; comparing the DNS resolution response with a preconfigured list of known mappings of domains to IP addresses; and determining whether the DNS resolution response is correct based on the comparing.

These and other aspects, advantages and salient features of the invention will become apparent from the following detailed description, which, when taken in conjunction with the annexed drawings, where like parts are designated by like reference characters throughout the drawings, disclose embodiments of the invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, aspects of the present invention provide a solution for detecting the presence of rogue DNS servers through the use of a monitor which passively observes the flow of traffic across a network between nodes, and looks for spoofed DNS traffic in that network. In some embodiments, the network may be a local Intranet, and in others, the network may be the Internet.

Figure 1:
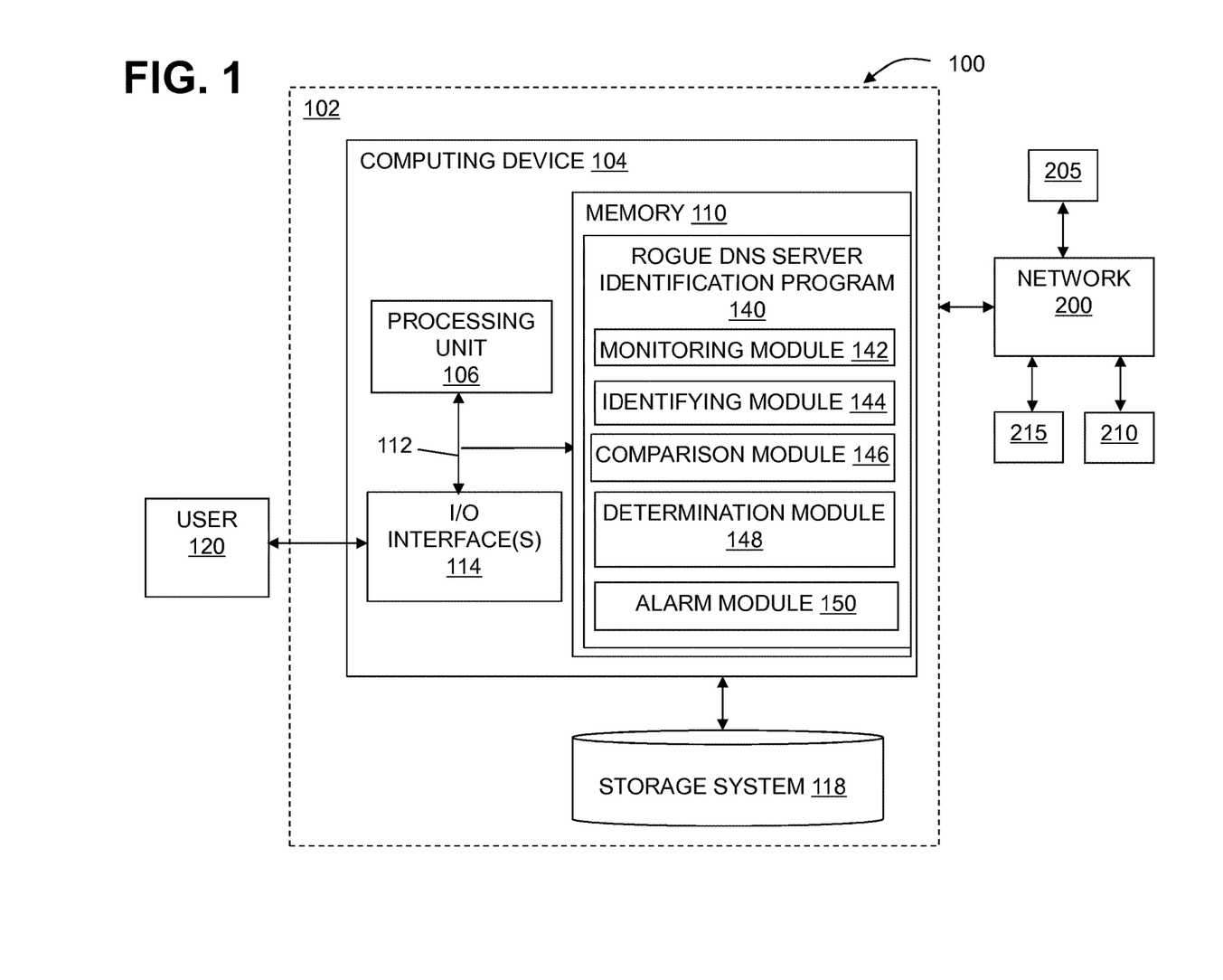
FIG. 1 shows a data processing system suitable for implementing an embodiment of the invention.

Turning to the drawings, FIG. 1 shows an illustrative monitor 100 for detecting the presence of rogue DNS servers 215 that may be present in network 200. To this extent, monitor 100 includes a computer system 102 that can perform a process described herein in order to identify an invalid DNS resolution response from a rogue DNS server 215. In particular, computer system 102 is shown including a computing device 104 that includes a rogue DNS server identification program 140, which makes computing device 104 operable to identify a rogue DNS server 215 by performing a process described herein.

Computing device 104 is shown including a processing unit 106 (e.g., one or more processors), a memory 110, a storage system 118 (e.g., a storage hierarchy), an input/output (I/O) interface component 114 (e.g., one or more I/O interfaces and/or devices), and a communications pathway 112. In general, processing unit 106 executes program code, such as rogue DNS server identification program 140, which is at least partially fixed in memory 110. To this extent, processing unit 106 may comprise a single processing unit, or be distributed across one or more processing units in one or more locations.

Memory 110 can also include local memory, employed during actual execution of the program code, bulk storage (storage 118), and/or cache memories (not shown) which provide temporary storage of at least some program code in order to reduce the number of times code must be retrieved from bulk storage 118 during execution. As such, memory 110 may comprise any known type of data storage and/or transmission media, including magnetic media, optical media, random access memory (RAM), read-only memory (ROM), a data cache, a data object, etc. Moreover, similar to processing unit 116, memory 110 may reside at a single physical location, comprising one or more types of data storage, or be distributed across a plurality of physical systems in various forms.

While executing program code, processing component 106 can process data, which can result in reading and/or writing transformed data from/to memory 110 and/or I/O component 114 for further processing. Pathway 112 provides a direct or indirect communications link between each of the components in computer system 102. I/O interface component 114 can comprise one or more human I/O devices, which enable a human user 120 to interact with computer system 102 and/or one or more communications devices to enable a system user 120 to communicate with computer system 102 using any type of communications link.

To this extent, rogue DNS server identification program 140 can manage a set of interfaces (e.g., graphical user interface(s), application program interface, and/or the like) that enable human and/or system users 120 to interact with rogue DNS server identification program 140. Further, rogue DNS server identification program 140 can manage (e.g., store, retrieve, create, manipulate, organize, present, etc.) the data, such as data stored in table 220 (FIGS. 2-4), using any solution.

In any event, computer system 102 can comprise one or more general purpose computing articles of manufacture 104 (e.g., computing devices) capable of executing program code, such as rogue DNS server identification program 140, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, rogue DNS server identification program 140 can be embodied as any combination of system software and/or application software. In any event, the technical effect of computer system 102 is to provide processing instructions to computing device 104 in order to identify a rogue DNS server.

Further, rogue DNS server identification program 140 can be implemented using a set of modules 142-150. In this case, a module 142-150 can enable computer system 102 to perform a set of tasks used by rogue DNS server identification program 140, and can be separately developed and/or implemented apart from other portions of rogue DNS server identification program 140. As used herein, the term "component" means any configuration of hardware, with or without software, which implements the functionality described in conjunction therewith using any solution, while the term "module" means program code that enables a computer system 102 to implement the actions described in conjunction therewith using any solution. When fixed in a memory 110 of a computer system 102 that includes a processing component 106, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 102.

When computer system 102 comprises multiple computing devices 104, each computing device 104 can have only a portion of rogue DNS server identification program 140 fixed thereon (e.g., one or more modules 142-150). However, it is understood that computer system 102 and rogue DNS server identification program 140 are only representative of various possible equivalent computer systems that may perform a process described herein. To this extent, in other embodiments, the functionality provided by computer system 102 and rogue DNS server identification program 140 can be at least partially implemented by one or more computing devices that include any combination of general and/or specific purpose hardware with or without program code. In each embodiment, the hardware and program code, if included, can be created using standard engineering and programming techniques, respectively.

When computer system 102 includes multiple computing devices 104, the computing devices can communicate over any type of communications link. Further, while performing a process described herein, computer system 102 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, rogue DNS server identification program 140 enables computer system 102 to implement identification of a rogue DNS server. To this extent, rogue DNS server identification program 140 is shown including a monitoring module 142, an identifying module 144, a comparison module 146, a determination module 148, and an alarm module 150.

Figure 2:
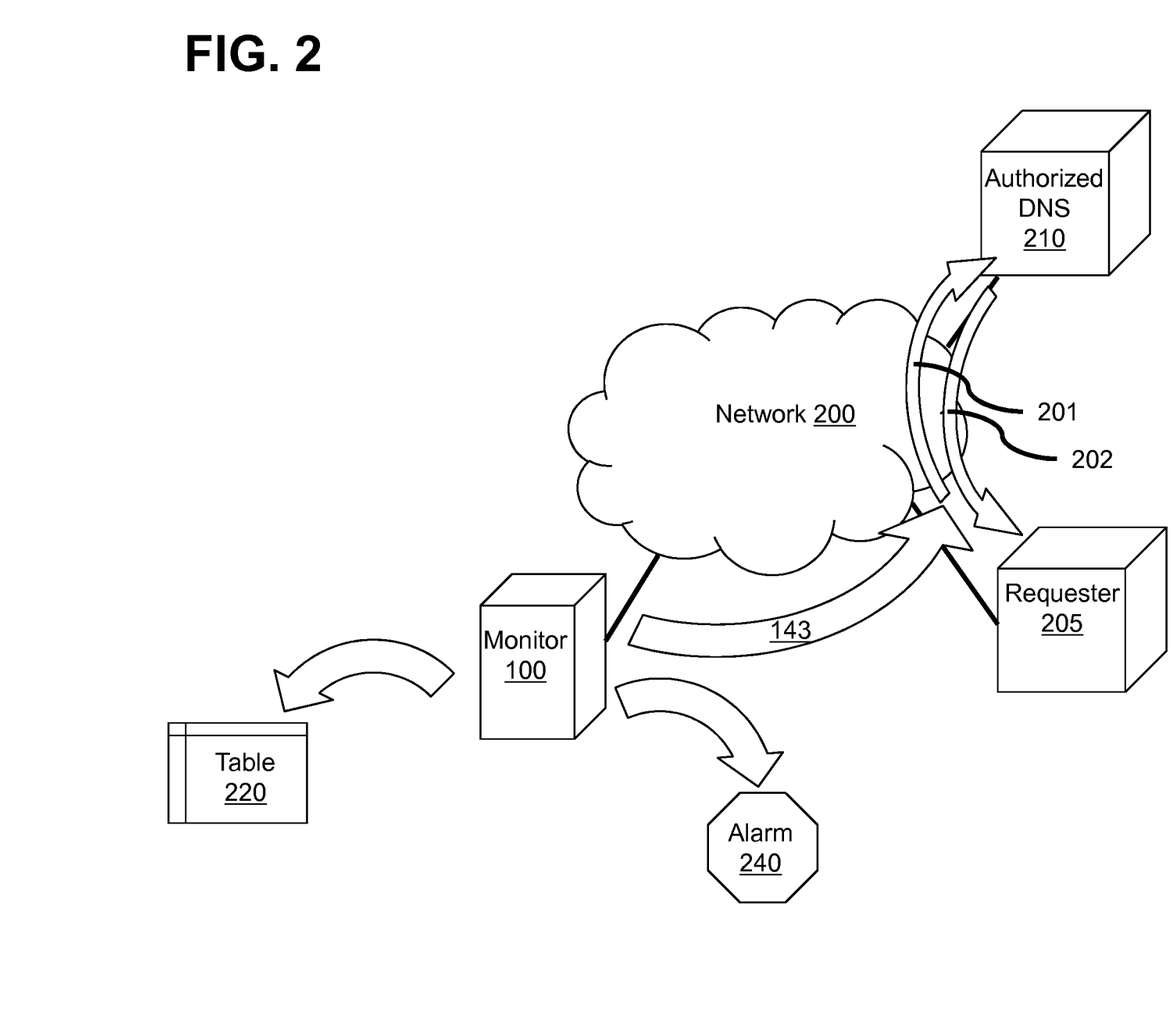
FIG. 2 shows a schematic data flow diagram illustrating monitoring of a network according to an embodiment of the invention.
Figure 3:
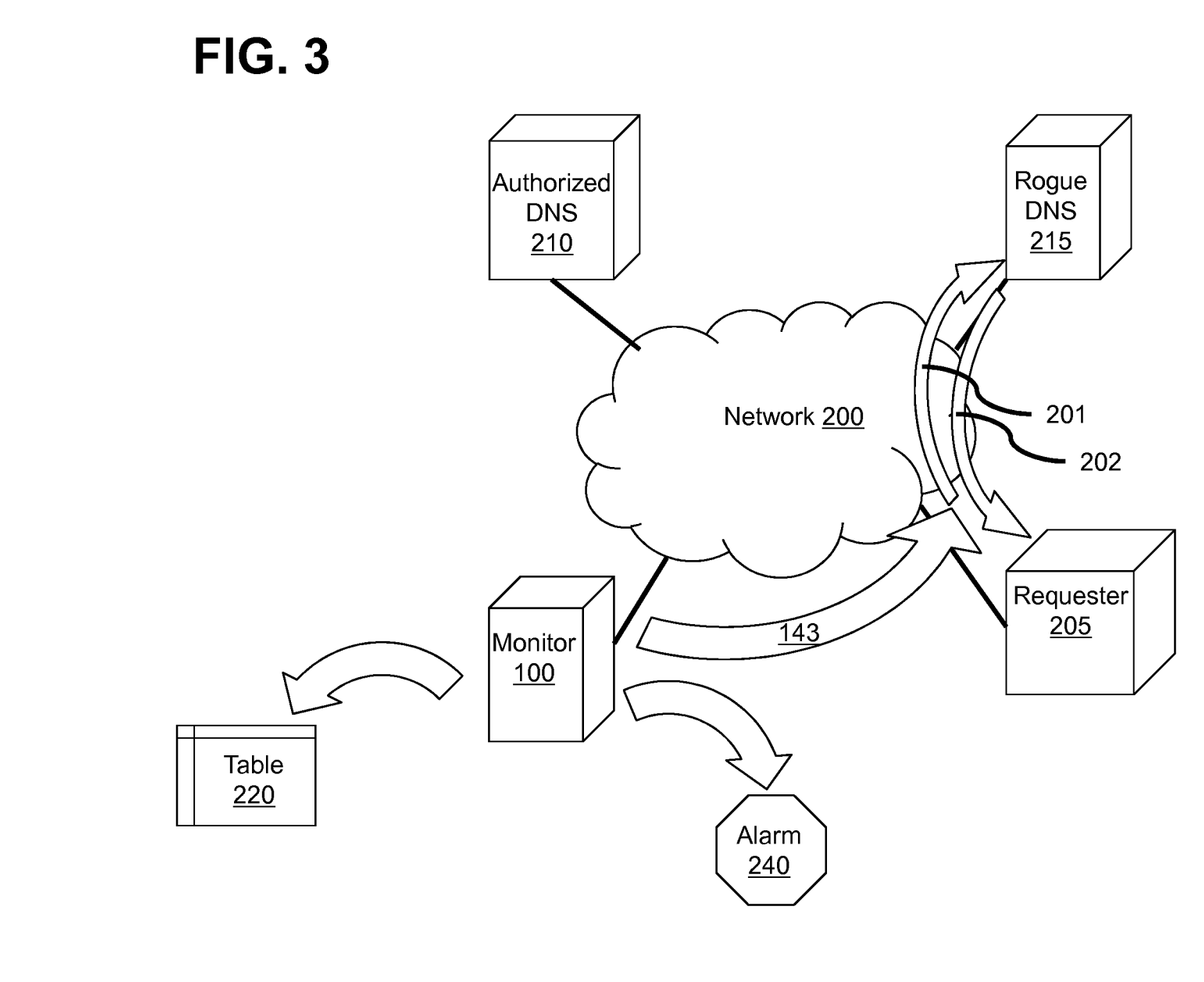
FIG. 3 shows a schematic data flow diagram illustrating identification of a rogue DNS server according to an embodiment of the invention.

Referring now to FIGS. 2-3, the network environment 200 in which monitor 100 may be used is depicted. As illustrated, network 200 may include a requester 205, which may be a client workstation operated by a user or a server. Additional requesters 205 may be included in network 200, but are omitted from the depiction of network 200 in FIGS. 2-3 for simplicity. Requester 205 may send a DNS resolution request 201 for resolution of a particular host's alphanumeric domain name into a numeric IP address.

As shown in FIG. 2, under normal operating conditions, in which an attacker is not present in network 200, DNS resolution request 201 is received and processed by authorized DNS server 210, which sends DNS resolution response 202. In that case, DNS resolution response 202 may contain a valid and accurate mapping of domain name to IP address.

In other cases, as shown in FIG. 3, an attacker's rogue DNS sever 215 may be present in network 200 with the purpose of impersonating another computing system. In this case, DNS resolution request 201 is received and processed by rogue DNS server 215, and DNS resolution response 202 is provided by rogue DNS server 215. Such a DNS resolution response 202 may contain an incorrect domain name to IP address mapping, resulting in either misrouting of network traffic in a spoofing attack in which sensitive traffic is delivered to an untrusted system, or impeding of network traffic in a denial of service (DOS) attack.

In either case, monitor 100 is positioned at a strategic point in network 200 such that monitor 100 can observe the flow of network traffic between nodes on network 200. As discussed above with reference to FIG. 1, monitor 100 includes modules 142-150, which when executed by computer system 102, perform passive monitoring of traffic on network 200, including, among other network traffic, DNS resolution requests 201 and DNS resolution responses 202.

Referring concurrently to FIGS. 1-3, monitoring module 142, part of monitor 100, performs monitoring 143 of traffic across network 200, including DNS resolution requests 201 and DNS resolution responses 202. Identification component 144 can identify, in the traffic monitored on the network 200, a DNS resolution response 202. As mentioned previously, a DNS resolution response 202 includes a mapping of a domain name 225 to an IP address 230 in response to a DNS resolution request 201 sent by requester 205.

Figure 4:
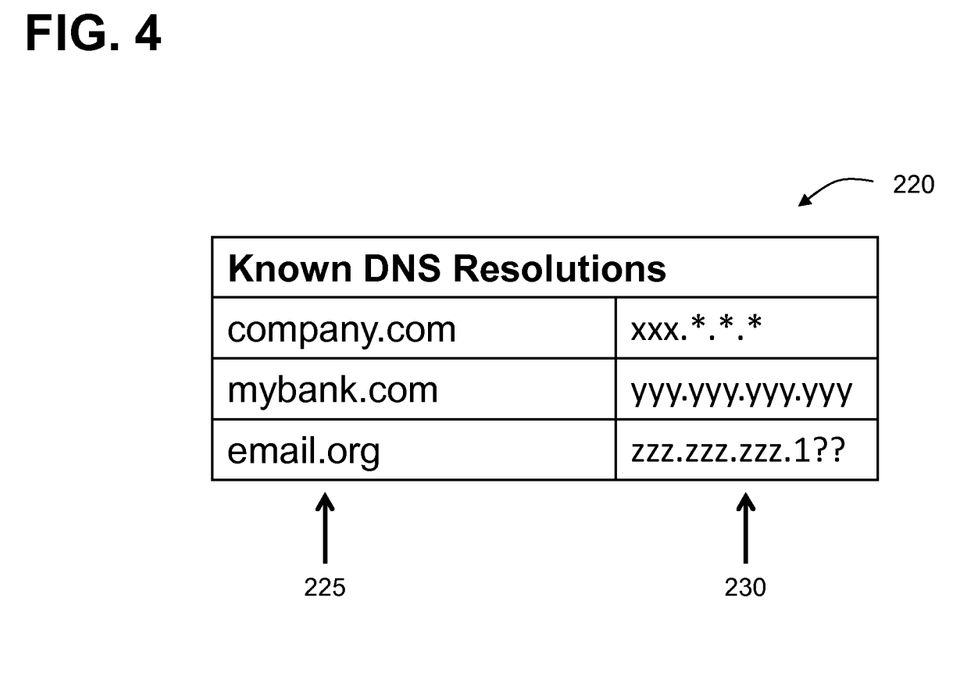
FIG. 4 shows a preconfigured DNS resolution table in accordance with an embodiment of the invention.

Once a DNS resolution response 202 is identified, comparison module 146 can perform a comparison of the DNS resolution response 202 with the known mappings stored in a preconfigured list of known mappings of domain names and IP addresses contained in a known DNS resolution table 220. The mappings of domain names to IP addresses contained in table 220 are known to be valid. As shown in FIG. 4, the IP address 230 stored in table 220 may be expressed as a specific IP address, such as yyy.yyy.yyy.yyy, the IP address of the domain mybank.com. In other embodiments, IP addresses 230 stored in table 200 may be expressed as a range of IP addresses using at least one wild card. A range of IP addresses may be broad, including several wild cards such as, for example, xxx.*.*.*, the IP address range for the domain company.com. In other embodiments the range of IP addresses may be narrower, for example having only one wild card, such as zzz.zzz.zzz.1??, the IP address range for the domain email.org.

According to embodiments of the invention, the list of mapped domain names 225 and IP addresses 230 stored in table 220 need not be an exhaustive list of domains that a user of network 200 may access, or for which requester 205 may request DNS resolutions. Rather, a selected number of hosts may be included in table 220 as a representative sample. In some embodiments, table 220 may include a preconfigured list of domains and their respective IP addresses whose selection for inclusion in table 220 is based on the domain hosting particularly sensitive information accessed by network users. In other embodiments, table 220 may include a preconfigured list of domains and their respective IP addresses whose selection for inclusion in table 220 is based on a high frequency of visits by users of network 200, and therefore a high likelihood of a large sample pool of DNS resolution requests and responses to monitor.

Referring back to FIGS. 1-3, determination module 148 performs a determination of whether the DNS resolution response 202 contains a correct and valid mapping of IP address to domain name. This determination is based on the comparison performed by comparison module 146. Where the mapping in DNS resolution response 202 matches the mapping for the respective domain name stored in table 220, DNS resolution response 202 is determined to be correct. This would indicate that DNS resolution response 202 may have been sent by authorized DNS server 210 (FIG. 2). Where the mapping in DNS resolution response 202 does not match the mapping for the respective domain name in table 220, DNS resolution response 202 is determined to be invalid. This would indicate that DNS resolution response 202 may have been sent by rogue DNS server 215 (FIG. 3), and may indicate the occurrence of either a spoof or DOS attack. In this case, alarm module 150 sends an alarm 240 to advise requester 205 of the spoofed DNS traffic. In various embodiments, alarm 240 may take the form of a message (email, SMS, etc.), a log entry, or other form of security event notification which documents and draws attention to the suspicious behavior.

Figure 5:
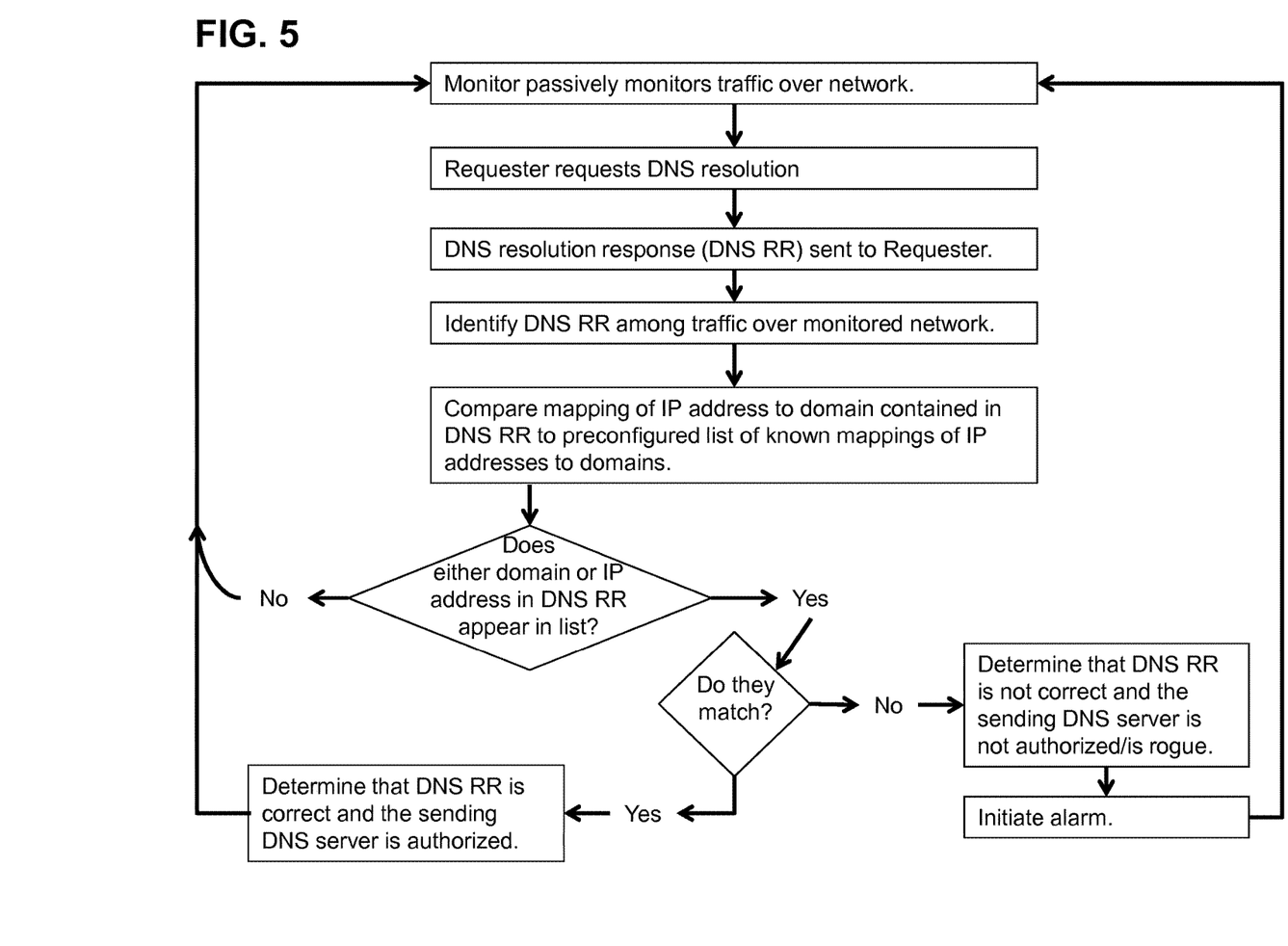
FIG. 5 shows a flow chart for a method of identifying a rogue DNS server in accordance with an embodiment of the invention.

The foregoing method is depicted in a flow chart in FIG. 5. As previously described, a monitor passively monitors traffic over a network. Over this network, a requesting workstation requests a DNS resolution of a particular domain. A DNS resolution response is returned to the Requester over the network by a DNS server. The DNS resolution response is identified by the monitor among the monitored network traffic. Once identified, the mapping of an IP address to a domain contained in the DNS resolution response is compared to a preconfigured list of known mappings of IP addresses to domains. If neither the domain nor the IP address in the DNS resolution response appears in the preconfigured list of known mappings of IP addresses to domains, the monitor simply returns to monitoring the network.

If either the domain or the IP address in the DNS resolution response appears in the preconfigured list of known mappings of IP addresses to domains, the mapping contained in the DNS resolution request is compared to the corresponding mapping in the preconfigured list of known mappings of IP addresses to domains. If the mapping matches, i.e. both the IP address and the respective domain are the same in the DNS resolution response and the preconfigured list of known mappings of IP addresses to domains, then it can be determined that the DNS resolution response is correct and the DNS server that sent it is authorized. If, however, the mapping does not match, i.e., the domain corresponds to different IP addresses in the DNS resolution response and the preconfigured list of known mappings of IP addresses to domains (or the IP address corresponds to different domains in the DNS resolution response and the preconfigured list of known mappings of IP addresses to domains), then it can be determined that the DNS resolution response is invalid. In such a case, it can be concluded that the DNS server that sent it is not authorized, and may be a rogue DNS server. In this instance, an alarm is initiated, alerting the requester to the security risk.

While shown and described herein as a method and system for identifying a rogue DNS server, it is understood that aspects of the invention further provide various alternative embodiments. For example, in one embodiment, the invention provides a computer program fixed in at least one computer-readable medium, which when executed, enables a computer system to implement identification of a rogue DNS server, To this extent, the computer-readable medium includes program code, such as rogue DNS server identification program 140 (FIG. 1), which implements some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as rogue DNS server identification program 140 (FIG. 1), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for identifying a rogue DNS server. In this case, a computer system, such as computer system 102 (FIG. 1), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

As used herein, the terms "first," "second," and the like, do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity). The suffix "(s)" as used herein is intended to include both the singular and the plural of the term that it modifies, thereby including one or more of that term (e.g., the server(s) includes one or more server). Ranges disclosed herein are inclusive and independently combinable (e.g., ranges of "up to about 3 wild cards, or, more specifically, about 1 wild cards to about 3 wild cards," is inclusive of the endpoints and all intermediate values of the ranges of "about 1 wild card to about 2 wild cards," etc.).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system comprising a non-transitory computer readable storage device, one or more processors, and program code stored on the non-transitory computer readable storage device for execution by the one or more processors to perform a method comprising:
    passively monitoring traffic on a network;
    identifying a DNS resolution response in the traffic on the network, wherein the DNS resolution response includes a mapping of a domain to an internet protocol (IP) address;
    comparing the DNS resolution response with a preconfigured list of known mappings of domains to IP addresses,
        wherein each IP address in the preconfigured list of known mappings of domains to IP addresses is a range of IP addresses expressed using at least one wild card;
    determining whether the DNS resolution response is correct based on the comparing; and
    sending an alarm in a case in which the DNS resolution response is determined to be incorrect.

2. The computer system of claim 1, wherein the alarm comprises at least one of an email message, an SMS message, a log entry, or a security event notification.

3. The computer system of claim 1, wherein the preconfigured list of known mappings of domains and IP addresses further includes a preconfigured list of domains most frequently visited by users of a network.

4. The computer system of claim 1, wherein the preconfigured list of known mappings of domains and IP addresses further includes a preconfigured list of domains hosting sensitive information accessed by network users.

5. The computer system of claim 1, wherein the network includes an intranet.

* * * * *